(12) United States Patent
Chen et al.

(10) Patent No.: US 12,270,795 B2
(45) Date of Patent: Apr. 8, 2025

(54) SEMI-ONLINE ANALYTICAL APPARATUS FOR MEASURING ATMOSPHERIC TRACE NITROGEN-CONTAINING ORGANIC COMPONENTS

(71) Applicant: FUDAN UNIVERSITY, Shanghai (CN)

(72) Inventors: Jianmin Chen, Shanghai (CN); Haiping Xiong, Shanghai (CN); Xiaona Shang, Shanghai (CN)

(73) Assignee: FUDAN UNIVERSITY, Shanghai (CN)

( * ) Notice: Subject to any disclaimer, the term of this patent is extended or adjusted under 35 U.S.C. 154(b) by 0 days.

(21) Appl. No.: 18/805,525

(22) Filed: Aug. 14, 2024

(65) Prior Publication Data
US 2025/0060344 A1    Feb. 20, 2025

(30) Foreign Application Priority Data

Aug. 18, 2023 (CN) .......................... 202311046559.3
Aug. 18, 2023 (CN) .......................... 202322233095.9

(51) Int. Cl.
    *G01N 30/72*    (2006.01)
    *G01N 30/14*    (2006.01)
    *G01N 30/16*    (2006.01)
    *G01N 30/30*    (2006.01)
    *G01N 30/06*    (2006.01)

(52) U.S. Cl.
CPC ......... *G01N 30/7233* (2013.01); *G01N 30/14* (2013.01); *G01N 30/16* (2013.01); *G01N 30/30* (2013.01); *G01N 2030/067* (2013.01); *G01N 2030/3053* (2013.01)

(58) Field of Classification Search
CPC .... G01N 30/7233; G01N 30/14; G01N 30/16; G01N 30/30; G01N 2030/067; G01N 2030/3053
See application file for complete search history.

(56) References Cited

U.S. PATENT DOCUMENTS 3,753,656 A * 8/1973 Matson ................. G01N 30/88
                                                                           436/154

* cited by examiner

*Primary Examiner* — Tarun Sinha
(74) *Attorney, Agent, or Firm* — IPRTOP LLC

(57) ABSTRACT

The disclosed apparatus includes a collision-type $PM_{2.5}$ filter, a resistive heating rod with a temperature sensor, a sealed water tank, a condensation system, a virtual concentrator, a flow controller, a vacuum pump, a particulate matter collection bottle, dimethylacetamide reagent, an ultrasonic bath, a fraction automatic supply/collect integrated pump, a vacuum parallel concentrator, a micro-injection pump, and a liquid chromatography-time-of-flight mass spectrometer. This apparatus can replace traditional filter sampling for collecting $PM_{2.5}$ greatly freeing up manpower, saving resources, and reducing organics loss in $PM_{2.5}$. The collected sample solution is injected into the liquid chromatography-mass spectrometer for online analysis of organic components. By introducing an enrichment system, the concentration of sample $PM_{2.5}$ can be increased at least by 10 times, enhancing the sampling capability of the apparatus. This apparatus achieves full automation of $PM_{2.5}$ sampling and collection. This apparatus can be widely applied in air quality monitoring and health risk assessment.

4 Claims, 1 Drawing Sheet

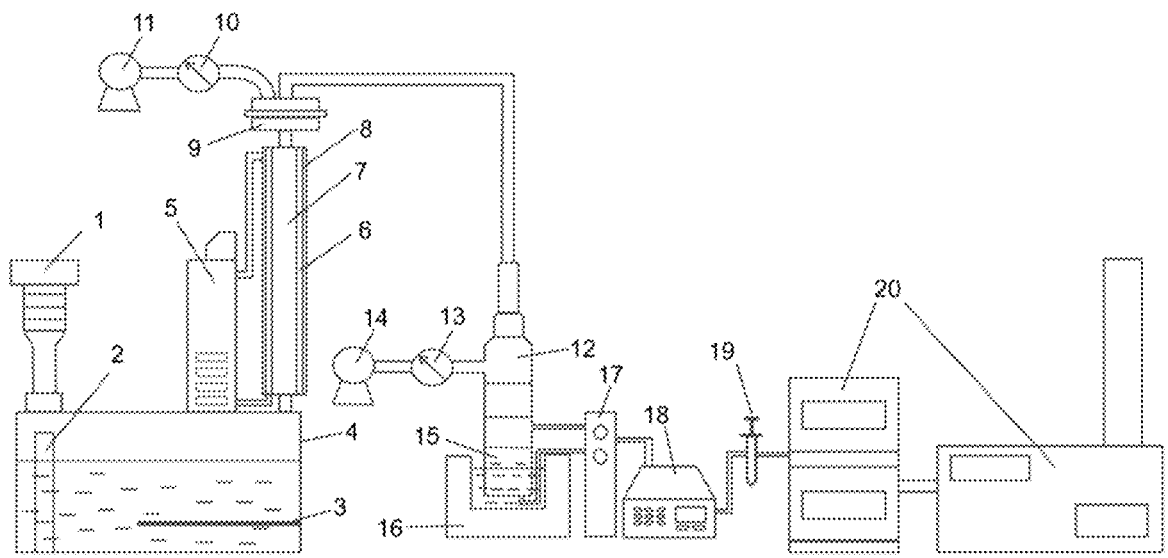

SEMI-ONLINE ANALYTICAL APPARATUS FOR MEASURING ATMOSPHERIC TRACE NITROGEN-CONTAINING ORGANIC COMPONENTS

CROSS REFERENCE

This application claims the priority of Chinese patent application No. 202311046559.3, entitled "A SEMI-ONLINE ANALYTICAL APPARATUS FOR MEASURING ATMOSPHERIC TRACE NITROGEN-CONTAINING ORGANIC COMPONENTS", filed at CNIPA on Aug. 18, 2023, which is incorporated by reference herein in its entirety.

FIELD OF THE INVENTION

This disclosure is related to the field of atmospheric environmental technology, in particular, to a semi-online apparatus for analyzing trace nitrogen-containing organic components in atmospheric fine particulate matter ($PM_{2.5}$).

BACKGROUND

Atmospheric fine particulate matter ($PM_{2.5}$, the aerodynamic particles of diameter less than or equal to 2.5 micrometers) refers to the collective term for various solid and liquid particles present in the atmosphere. These particles maybe uniformly dispersed in the air, forming a relatively stable and large suspended system. $PM_{2.5}$, a widely studied fine particulate matter due to their properties contaminating air quality, disturbing global climate and impacting public health and ecosystem. Since their inhalable nature, they are also known as inhalable fine particulate matter. With a diameter less than $1/20^{th}$ the thickness of a human hair, $PM_{2.5}$ is a residue emitted through fossil fuel combustion processes such as combustion engine vehicle exhaust emission, power generation from conventional fossil fuels, and industrial production. They often contain toxic substances such as heavy metals and aromatic compounds. Although $PM_{2.5}$ particles are only a trace component of the Earth's atmospheric composition, their small particle sizes and high concentration of toxic and harmful substances, coupled with the long-life time and long-range transport in the atmosphere, $PM_{2.5}$ particles have significant impacts on human health and the Earth's greenhouse effect. To study $PM_{2.5}$, researchers typically collect and analyze them over a certain period of time, maybe as long as six months, one year, or even three years. The commonly used collection method is the active sampling, where a pump is used to absorb the $PM_{2.5}$ onto a medium substance. The commonly used media today include quartz membranes and Teflon™ membranes. However, this method inevitably involves complex pretreatment procedures, such as cutting the membrane, organic solvent extraction, ultrasonication, concentration, filtration, and chromatographic column purification. If a long-term sampling is required in six months, one year, or even three years, these repetitive operations will consume a significant amount of manpower and resources. Moreover, during this process, there is a high possibility of excessive loss of the target components in the samples, resulting in deviations and instability in the monitoring data. Additionally, after significant improvements in atmospheric pollution control with time, the number of particles in the atmosphere may have significantly decreased, making it difficult to meet the minimum detection limits of instruments for the collected samples. Therefore, there is an urgent need for a particles $PM_{2.5}$ collection and analysis system that are capable of enrichment capabilities, online operation, low cost, good repeatability, and high automation to address the complex research challenges in the collection and processing of $PM_{2.5}$.

SUMMARY

This disclosure is related to the field of atmospheric environmental technology and specifically is related to a semi-online apparatus for analyzing trace nitrogen-containing organic components in atmospheric fine particulate matter ($PM_{2.5}$). The apparatus includes a collision-type $PM_{2.5}$ filter, a resistive heating rod with a temperature sensor, a sealed water tank, a condensation system, a virtual concentrator, a flow controller, a vacuum pump, a particulate matter collection bottle, dimethylacetamide reagent, an ultrasonic bath, a fraction automatic supply/collect integrated pump, a vacuum parallel concentrator, a micro-injection pump, and a liquid chromatography time-of-flight mass spectrometer. This apparatus can replace the traditional filter sampling for collecting $PM_{2.5}$ thus greatly freeing up manpower, saving resources, and reducing organics loss in $PM_{2.5}$. The collected sample solution is injected into the liquid chromatography-mass spectrometer for online analysis of organic components. By introducing an enrichment system, the concentration of sample $PM_{2.5}$ can be increased at least by 10 times, enhancing the sampling sensitivity of the apparatus. This apparatus achieves full automation of $PM_{2.5}$ sampling and collection. It can be widely applied in air quality monitoring and health risk assessment.

BRIEF DESCRIPTION OF THE DRAWINGS

FIG. 1 is a schematic of the apparatus for measuring trace nitrogen-containing organic components.

Below are the reference numerals in FIG. 1:

1. collision-type $PM_{2.5}$ filter, 2 transparent window, 3 resistance heating rod with temperature sensor, 4 sealed water tank, 5 condenser, 6 external condenser coil, 7 internal condensation tube, 8 thermal insulation layer, 9 virtual concentrator, 10 high-flow volume flow controller, 11 high-flow vacuum pump, 12 particulate matter collection bottle, 13 low-flow volume flow controller, 14 low-flow vacuum pump, 15 dimethylacetamide organic reagent, 16 ultrasonic bath, 17 fraction automatic supply/collect integrated pump, 18 vacuum parallel concentrator, 19 micro-injection pump, 20 liquid chromatography-time-of-flight mass spectrometer.

DETAILED DESCRIPTION OF THE DISCLOSURE

It should be understood that the examples and embodiments described herein are for illustrative purposes only and that various modifications or changes in light thereof will be suggested to persons skilled in the art and are to be included within the spirit and purview of this application.

Such alterations, modifications, and improvements are intended to be part of this disclosure, and are intended to be within the spirit and scope of the disclosure. Further, though advantages of the present disclosure are indicated, it should be appreciated that not every embodiment of the disclosure will include every described advantage. Some embodiments may not implement any features described as advantageous herein and in some instances. Accordingly, the foregoing description and drawings are by way of example only.

The present disclosure now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout. As used herein, terms such as "top," "bottom," "front," etc. are used for explanatory purposes in the examples provided below to describe the relative position of certain components or portions of components.

The disclosure provides a semi-online analysis apparatus for trace nitrogen-containing organic components having $PM_{2.5}$. This apparatus contains enrichment function, online capability, low cost, good repeatability, and high degree of automation, fully equipped to solve the complex technical problems of collection and processing data of $PM_{2.5}$.

The semi-online analysis apparatus for measuring trace nitrogen-containing organic components in $PM_{2.5}$ provided by this disclosure, as shown in FIG. 1, includes: collision-type $PM_{2.5}$ filter 1, transparent window 2, resistance heating rod with temperature sensor 3, sealed water tank 4, condenser 5, external condenser coil 6, internal condensation tube 7, thermal insulation layer 8, virtual concentrator 9, high-flow volume flow controller 10, high-flow vacuum pump 11, particulate matter collection bottle 12, low-flow volume flow controller 13, low-flow vacuum pump 14, dimethylacetamide organic reagent 15, ultrasonic bath 16, fraction automatic supply/collect integrated pump 17, vacuum parallel concentrator 18, micro-injection pump 19, and liquid chromatography-time-of-flight mass spectrometer 20.

The collision-type $PM_{2.5}$ filter 1 is connected to the inlet of the sealed water tank 4 through a matching management connection (e.g., connected by a 16 mm steel pipe and an 18 mm conductive silicone tube).

The sealed water tank 4 is made of stainless steel, which facilitates the full heat conduction of the water tank. It is equipped with a transparent window 2 made of high-strength glass on the right side of the front, which is used to observe the liquid level of the ultrapure water added to the tank.

The resistance heating rod with temperature sensor 3 is set inside the sealed water tank 4, 25-35 cm away from the bottom. The temperature sensor carried by the resistance heating rod is connected to the data line, and the temperature sensor is at least 30 cm away from the heating rod, inserted parallel to the heating rod from a position 3-4 cm above the bottom of the water tank, with a depth of 5-10 cm. The resistance heating rod is used to heat the ultrapure water in the sealed water tank 4, and the temperature sensor is used to measure the temperature of the ultrapure water in the sealed water tank 4.

The internal condensation tube 7 of the condenser is connected to the outlet of the sealed water tank on the left side through a customized flange.

The external condensation coil 6 of the condenser is tightly wound around the external surface of the internal condensation tube 7 of the condenser. It is made of flexible copper material. The condenser 5 is connected to both ends of the external condensation coil 6. The ethanol coolant generated by the condenser 5 passes through the external condensation coil 6, producing a cooling effect. A layer of pure cotton insulation layer 8 is wrapped around the external condensation coil 6 for heat preservation.

The low end of virtual concentrator 9 is coaxially connected to the upper end of the internal condensation tube 7 of the condenser through a customized flange. The virtual concentrator 9 divides the airflow into two paths: exhausted gas path (upper right outlet of the virtual concentrator 9) and concentrated gas path (upper left outlet of the virtual concentrator 9). The concentrated gas path is connected to the inlet of the particulate matter collection bottle 12 through a fixed pipeline. The exhausted gas path is connected to the high-flow volume flow controller 10 through a pipeline, and then to the high-flow vacuum pump 11.

The ultrasonic bath 16 is filled with ultrapure water to a height of 10-15 cm.

The particulate matter collection bottle 12 is suspended in the cavity of the ultrasonic bath 16 (i.e., with a small distance (such as 2-3 cm) from the bottom of the ultrasonic bath 16). The upper outlet of the particulate matter collection bottle 12 is connected to the low-flow volume flow controller 13 and the low-flow vacuum pump 14 in sequence. The low-flow vacuum pump 14 is used to extract the concentrated airflow in the concentrated gas path into the particulate matter collection bottle 12, and the low-flow volume flow controller 13 is used to control the flow rate of the concentrated gas extracted into the particulate matter collection bottle 12 by the low-flow vacuum pump 14.

The middle and bottom positions of the particulate matter collection bottle 12 are respectively connected to the supplying and collecting pipelines of the fraction automatic supply/collect integrated pump 17. The fraction automatic supply/collect integrated pump 17 supplies the dimethylacetamide solvent 15 into the particulate matter collection bottle 12 through a pipeline, and collects the atmospheric sample dissolved in the dimethylacetamide solvent 15 in the particulate matter collection bottle 12 through another pipeline.

The fraction automatic supply/collect integrated pump 17 is connected to the vacuum parallel concentrator 18 and the micro-injection pump 19 in sequence through pipelines. The vacuum parallel concentrator 18 concentrates the sample solution collected and transferred by the fraction automatic supply/collect integrated pump 17 to a specified volume, and then transfers the concentrated sample solution of the set volume to the micro-injection needle on the micro-injection pump 19. The remaining solution is diverted to the exhausted liquid bucket.

The micro-injection needle on the micro-injection pump 19 is connected in series with the liquid phase inlet of the liquid chromatography-time-of-flight mass spectrometer 20 through a Teflon™ pipeline. During injection, the micro-injection pump provides a constant injection pressure to the micro-injection needle to ensure a constant injection volume. After the injection is completed, the liquid chromatography-time-of-flight mass spectrometer 20 is activated to analyze the organic components in the collected sample solution.

The present disclosure apparatus is used for the concentration, collection, and semi-online analysis of atmospheric particulate matter. The collision-type $PM_{2.5}$ filter 1 is used to filter out atmospheric particles with an acrodynamic diameter less than or equal to 2.5 micrometers, and the filtered particles are drawn into the apparatus by the suction force provided by the high-flow vacuum pump 11 and the low-flow vacuum pump 14. The specific process is as follows:

(1) Before sampling, a set volume (adjusted according to the sampling time, with a recommended volume of 10-20 milliliters for half a day of sampling) of dimethylacetamide (liquid chromatography grade) solution 15 is added to the bottom of the particulate matter collection bottle 12 by the fraction automatic supply/collect integrated pump 17.

(2) Through the transparent window 2, ultrapure water is added to the closed water tank 4 to a height of ⅖-⅗ of the tank. The ultrapure water is heated to a specified temperature (generally 35±2 degrees Celsius) using a resistance heating rod with a temperature sensor 3, resulting in supersaturated water vapor in the water tank 4. The $PM_{2.5}$ drawn in from the outside first combine with the water vapor in the water tank to form larger particles, and then pass through the condensation inner tube 7.

(3) The central axis of the condensation inner tube 7 is coaxially placed with the outlet of the water tank 4, and the connection is made using a flange and a sealing ring. The condensation outer tube 6 is tightly wound around the outside of the condensation inner tube 7 with a soft spiral copper tube. The lower end of the copper tube is connected to the outlet of the condenser 5, and the higher end is connected to the inlet, allowing the condensation liquid to circulate externally. The condensation liquid is a 60-80% ethanol-water solution (which may vary depending on the specific situation, with a higher ethanol content required for lower condensation temperatures). The temperature of the condensation liquid is set between −20 and −5 degrees Celsius to ensure that the particles passing through the condensation tube can condense and grow, then the aerodynamic diameters of the majority of $PM_{2.5}$ particles increase to 3-4 micrometers. In addition, a 2 cm-5 cm thick thermal insulation layer 8 made of cotton material is wrapped around the spiral tube to stabilize the internal temperature of the condensation tube.

(4) Next, the grown $PM_{2.5}$ in the condensation tube enters the virtual concentrator 9, where the airflow is divided into two paths: the exhausted gas path (upper right outlet of the virtual concentrator 9) and the concentrated gas path (upper left outlet of the virtual concentrator 9). The outlet of the exhausted gas path is connected to the high-flow volume flow controller 10, which controls the air extraction flow rate of the high-flow vacuum pump 11. The control flow rate of the exhausted gas path is 55-65 liters per minute, and the range of the high-flow volume flow controller is 0-100 liters per minute. The outlet of the concentrated gas path is connected to the low-flow volume flow controller 13, which controls the air extraction flow rate of the low-flow vacuum pump 14. The control flow rate of the concentrated gas path is 5-6 liters per minute, and the range of the low-flow volume flow controller is 0-12 liters per minute. According to the principles of aerodynamics and the experimental verification of particle trajectories, the concentrated gas path is the main path for particles to pass through. In theory, when the flow rate of the concentrated gas path accounts for ⅑ to 1/11 of the total flow rate of the gas paths (exhausted gas path flow rate plus concentrated gas path flow rate), the concentration of particles in the concentrated gas path becomes nine to eleven times the original atmospheric particle concentration, thus achieving concentrated result.

(5) The airflow in the concentrated gas path passes through the particulate matter collection bottle 12, generating a rotating vortex, and the $PM_{2.5}$ in the airflow collides with the dimethylacetamide reagent in the particulate matter collection bottle and is adsorbed. Due to the high extraction capacity of the reagent, the organic components of $PM_{2.5}$ are extracted and dissolved in the reagent, achieving online extraction.

(6) During the sampling process, the ultrasonic bath 16 continuously oscillates at regular intervals (e.g., every 4-8 minutes) for a duration of 20-30 minutes to ensure full dissolution of $PM_{2.5}$ in the organic reagent.

(7) The sampling time period (0.5-24 hours) is set, and the collected dimethylacetamide sample solution is transferred to the vacuum parallel concentrator (18) through the fraction automatic supply/collect integrated pump 17 at regular intervals.

(8) The new dimethylacetamide reagent (e.g., 10-15 milliliters) is injected into the particulate matter collection bottle 12 by the automatic supply/collect pump 17.

(9) The vacuum parallel concentrator 18 concentrates the sample solution according to the set concentration volume (e.g., 0.5-1.5 milliliters) and operation period (e.g., 0.5-2 hours, generally shorter than the sampling time), and transfers it to the micro-injection needle on the micro-injection pump 19. The remaining solution is diverted to the exhausted liquid bucket.

(10) Finally, the micro-injection pump 19 injects the collected sample solution into the liquid chromatography-time-of-flight mass spectrometer 20. During the injection, the micro-injection pump applies a constant injection pressure to the micro-injection needle to ensure a uniform injection into the set injection volume (2-10 microliters). After the injection is complete, the liquid chromatography-time-of-flight mass spectrometer 20 is activated to analyze the organic components in the collected sample solution. The injection volume of the micro-injection pump 19 is set to 2-10 microliters, and the injection speed is 2-8 microliters per second.

The apparatus operates in a cyclic manner according to the set time, enabling semi-online analysis of trace nitrogen-containing organic components in $PM_{2.5}$.

The present disclosure describes a semi-online apparatus for analyzing trace nitrogen-containing organic components in $PM_{2.5}$. This apparatus can replace traditional filter sampling methods for collecting $PM_{2.5}$, eliminating the need for filter cutting, organic solvent extraction, and other pretreatment processes. This greatly reduces labor and material costs, while also minimizing losses during sample handling and transfer. Additionally, the introduction of an enrichment system allows for a tenfold increase in the concentration of atmospheric particulate matter, significantly enhancing the sampling capability of the apparatus. Furthermore, this apparatus achieves fully automated sampling and collection of atmospheric particulate matter, requiring only the setting of sampling time and period. By using a specific organic solvent that can be directly injected into the chromatography without damaging the chromatographic column, this apparatus can be used in conjunction with gas chromatography and liquid chromatography. The collected sample solution can be quantitatively concentrated online using a vacuum parallel concentrator, enabling online quantitative collection of atmospheric $PM_{2.5}$ samples. Finally, the collected sample solution is injected into the liquid chromatography-mass spectrometry system using a micro-injection pump for online analysis of the organic components in the collected sample solution. This apparatus has wide applications in environmental monitoring and health risk assessment.

The technical features and advantages of this disclosure are as follows:

(1) This apparatus enables the use of organic solvents as a medium for sampling $PM_{2.5}$, eliminating the complex pre-treatment processes of traditional membrane sampling, such as membrane cutting, organic solvent extraction, ultrasonication wait, and concentration, while reducing the loss of organic components during sample handling.

(2) Due to the low volatility of the selected solvent, dimethylacetamide (with a saturated vapor pressure of only 0.17 kPa at 25 degrees Celsius), this apparatus has low solvent volume requirements, requiring only about 15 mL of solvent for half a day of sampling, thus reducing sampling costs.

(3) This apparatus can concentrate actual $PM_{2.5}$ by 7 to 10 times (depending on particle size), with high concentration efficiency and stable performance.

(4) The use of a vacuum parallel concentrator allows for rapid concentration of the collected sample solution to a set volume, achieving online quantitative collection of organic components in $PM_{2.5}$.

(5) The system is connected to a liquid chromatography-time-of-flight mass spectrometer system, which has higher sensitivity and resolution compared to traditional quadrupole mass spectrometry, making it more suitable for online analysis of organic components in $PM_{2.5}$.

(6) The sampling end of this apparatus has low requirements for pump flow rate, with a flow rate of only 6 liters per minute in the concentration gas path, reducing the loss of volatile organic compounds in the fine particulate matter during collection.

(7) This apparatus is used in conjunction with a fraction automatic supply/collect integrated pump, enabling automated timed periodic sampling without the need for manual intervention during the sampling period, greatly reducing labor consumption.

(8) It is worth noting that this apparatus uses dimethylacetamide as the sampling medium. This solvent, known as a "universal solvent," can efficiently extract and dissolve organic substances in fine particulate matter and can be directly injected into precise instruments such as gas chromatography-mass spectrometer and liquid chromatography-mass spectrometer, laying the foundation for online monitoring of organic components in $PM_{2.5}$.

(9) This apparatus is easy to operate, reliable, easy to maintain, and cost-effective.

Following are some specific implementation methods such as the implementation Example 1. The present disclosure is further described through the implementation examples and accompanying FIG. 1.

First, ultrapure water is injected into the water tank 4 to a ⅗ of the total height. The temperature control is set to 35±1 degrees Celsius, and the ultrapure water is heated using a resistive heating rod 3 equipped with a temperature sensor. At the same time, an 80% ethanol solution (aqueous solution) is injected into the condenser 8, and its temperature is set to −10±1 degrees Celsius. The condensate external circulation is then opened. Next, a collision-type $PM_{2.5}$ filter is placed in the actual atmospheric environment, and the high-flow vacuum pump 11 and low-flow vacuum pump 14 are turned on. The high-flow vacuum pump flow is controlled to 65 liters per minute using the high-flow volume flow controller 10, and the low-flow vacuum pump flow is controlled to 6 liters per minute using the low-flow volume flow controller. Subsequently, 10 milliliters of dimethylacetamide reagent are injected into the particulate matter collection bottle using the fractional automatic supply/collect integrated pump 17, and the sample solution collected by the dimethylacetamide reagent is collected in the vacuum parallel concentrator 18. Then, new dimethylacetamide reagent (10 milliliters) is injected. The 18 vacuum parallel concentrator is opened, and the quantitative concentration volume is set to 1 milliliter with an operation period of 1 hour. Finally, the concentrated collected sample solution is injected into the ultra-high pressure liquid chromatography-time-of-flight mass spectrometer 20 (7 microliters) using a micro-injection pump for online detection and analysis of organic components in the collected sample solution. This apparatus achieves semi-online analysis of trace nitrogen-containing organic components in $PM_{2.5}$, mainly based on $PM_{2.5}$ enrichment sampling and sample solvent quantitative concentration technology, greatly improving the concentration of collected particulate matter. In addition, using organic solvents as the medium for sampling $PM_{2.5}$ eliminates the complicated pre-treatment processes. For example, traditional filter sampling includes steps of membrane cutting, organic solvent extraction, ultrasound, and concentration. As shown in Table 1, the concentrations of 4-nitrophenol, 4-nitrophenol, and 5-nitrosalicylic acid in the samples after enrichment are increased by nearly ten times, optimizing the detection limit of trace organic compounds in particulate matter. As shown in Table 2, the volume after concentration is consistent with the set concentration volume (1 milliliter), indicating that the apparatus has excellent quantitative detection capability. The concentrations of trace nitrogen-containing organic components (4-nitrophenol, 4-nitrocatechol, and 5-nitrosalicylic acid; unit: nanograms per cubic meter) in $PM_{2.5}$ before and after enrichment by this sampling apparatus is compared in Table 1. The volume before and after vacuum concentration by 18 vacuum parallel concentrator is compared in Table 2.

TABLE 1

Concentrations of trace nitrogen-containing organic components (4-nitrophenol, 4-nitrocatechol, and 5-nitrosalicylic acid; unit: nanograms per cubic meter) in $PM_{2.5}$ before and after enrichment.

| The order number | Detection of species | After enrichment | Before enrichment |
|---|---|---|---|
| 1 | 4-nitrophenol | 5.5454 | 0.5415 |
| 2 | 4-nitrophenol | 8.8544 | 0.8423 |
| 3 | 4-nitrophenol | 2.5646 | below the test limit |
| 4 | 4-nitrocatechol | 4.5465 | 0.43546 |
| 5 | 4-nitrocatechol | 3.1565 | below the test limit |
| 6 | 4-nitrocatechol | 4.5422 | below the test limit |
| 7 | 5-nitrosalicylic acid | 5.5546 | 0.5654 |
| 8 | 5-nitrosalicylic acid | 3.1240 | below the test limit |
| 9 | 5-nitrosalicylic acid | 2.1350 | below the test limit |

TABLE 2

Volume comparison before and after vacuum concentration (unit: ml).

| The order number | Before concentration | After concentration |
|---|---|---|
| 1 | 9.89 | 0.97 |
| 2 | 9.45 | 0.94 |
| 3 | 9.75 | 0.97 |
| 4 | 9.43 | 0.95 |
| 5 | 9.63 | 0.97 |
| 6 | 9.45 | 0.94 |

CONCLUSION

The disclosure provides a semi-online analysis apparatus for trace nitrogen-containing organic components in $PM_{2.5}$, which has enrichment function, online capability, low cost, good repeatability, and high degree of automation, in order to solve the technical problems of complex collection and processing processes of $PM_{2.5}$.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. An apparatus for analyzing an atmospheric sample of trace nitrogen-containing organic fine particles $PM_{2.5}$ (particle size smaller than 2.5 micrometer), comprising:

a collision-type $PM_{2.5}$ filter, a transparent window, a resistive heating rod which includes a temperature sensor, a sealed water tank, a condenser, an external condensation coil, an internal condensation tube, a thermal insulation layer, a virtual concentrator, a high-flow volume flow controller, a high-flow vacuum pump, a particulate matter collection bottle, a low-flow volume flow controller, a low-flow vacuum pump, dimethylacetamide organic reagent, an ultrasonic bath, a fraction automatic supply/collect integrated pump, a vacuum parallel concentrator, a micro-injection pump equipped with a micro-injection needle, and a liquid chromatography time-of-flight mass spectrometer;

wherein the collision-type $PM_{2.5}$ filter is connected to an intake of the sealed water tank through a matching management system;

wherein the sealed water tank comprises a transparent window located at a first side the sealed water tank near the intake for observing a level of ultrapure water added to the tank;

wherein the resistive heating rod with the temperature sensor is positioned inside the sealed water tank, wherein the resistive heating rob is inserted into the sealed water tank at a depth of 20-30 cm and arranged above a bottom of the sealed water tank in a range of 3-4 cm;

wherein the temperature sensor is connected to the resistive heating rod via a data cable which is arranged at a minimum distance of 30 cm from the temperature sensor, and wherein the temperature sensor is inserted parallel to the resistive heating rod at a position about 5-10 cm along a length of the resistive heating rod and about 3-4 cm above the bottom of the sealed water tank; wherein the resistive heating rod heats the ultrapure water in the sealed water tank, and the temperature sensor measures a temperature of the ultrapure water;

wherein the internal condenser tube is connected to an outlet on a second side of the sealed water tank opposite to the first side through a first custom flange; wherein the external condenser coil is wrapped around an external surface of the internal condenser tube, and the condenser is connected to both ends of the condenser coil; wherein the condenser coil is wrapped with the thermal insulation layer for thermal insulation;

wherein the condenser generates an ethanol coolant which passes through the condenser coil to produce cooling effects;

wherein the virtual concentrator is coaxially connected to a lower end of the internal condenser tube through a second custom flange, wherein the virtual concentrator divides an airflow into two paths: an exhaust gas path at a first outlet of the virtual concentrator, and a concentrated gas path at a second outlet of the virtual concentrator, wherein the concentrated gas path is connected to a particulate matter collection bottle via a fixed pipeline, and the exhaust gas path is connected to the high-flow volume flow controller and the high-flow vacuum pump via pipes; wherein the high-flow vacuum pump generates an airflow for a main sampling suction force in the semi online analytical apparatus, and wherein the high-flow volume flow controller controls the airflow generated by the high-flow vacuum pump;

wherein the ultrasonic bath is filled with ultrapure water to a height in a range of 10-15 cm;

wherein the particulate matter collection bottle is suspended in a cavity of the ultrasonic bath, with a distance of about 2-3 cm between a bottom of the particulate matter collection bottle and a bottom of the ultrasonic bath;

wherein an upper outlet of the particulate matter collection bottle is connected to the low-flow volume flow controller and the low-flow vacuum pump in sequence; wherein the low-flow vacuum pump extracts concentrated gas from the concentrated gas path into the particulate matter collection bottle, wherein the low-flow volume flow controller controls a flow rate of the concentrated gas extracted into the particulate matter collection bottle by the low-flow vacuum pump; wherein middle and bottom positions of the particulate matter collection bottle are connected to the fraction automatic supply/collect integrated pump via pipelines;

wherein the fraction automatic supply/collect integrated pump injects a dimethylacetamide solvent into the particulate matter collection bottle through one pipeline, and collects atmospheric fine particulate matter ($PM_{2.5}$) samples dissolved in the dimethylacetamide solvent from the particulate matter collection bottle through another pipeline; wherein the fraction automatic supply/collect integrated pump is connected to the vacuum parallel concentrator and the micro-injection pump in sequence via pipelines; wherein the fraction automatic supply/collect integrated pump transfers a specified volume of a collected sample solution to the vacuum parallel concentrator to be concentrated, and then the concentrated sample solution of the specified volume is transferred to the micro-injection needle on the micro-injection pump, wherein a remaining solution is diverted to an exhausted liquid bucket; and wherein the micro-injection needle on the micro-injection pump is connected in series with a liquid phase injection port of the liquid chromatography-time-of-flight mass spectrometer via a pipeline, wherein the liquid chromatography-time-of-flight mass spectrometer analyzes organic components in the concentrated sample solution.

2. The apparatus for analyzing the atmospheric sample of trace nitrogen-containing organic fine particles $PM_{2.5}$ as disclosed in claim 1, wherein the collision-type $PM_{2.5}$ filter filters out atmospheric particles which have aerodynamic equivalent diameters at less than or equal to 2.5 micrometers, and wherein filtered particles are drawn into the apparatus by a suction provided by the high-flow vacuum pump and the low-flow vacuum pump.

3. A method for analyzing the atmospheric sample of trace nitrogen-containing organic fine particles $PM_{2.5}$, as in claim 2, wherein the method comprises following steps:

step 1: before sampling, the fraction automatic supply/collect integrated pump adding a set volume of dimethylacetamide solvent to the bottom of the particulate matter collection bottle at a set time;

step 2: through the transparent window, adding the ultrapure water to the sealed water tank to a height of $\frac{2}{5}$-$\frac{3}{5}$ of the tank, the resistive heating rod with the temperature sensor heating the ultrapure water to a specified temperature, generating supersaturated water vapor in the water tank, wherein the $PM_{2.5}$ particles drawn in from outside first combine with the supersaturated water vapor in the sealed water tank, forming particles larger than the drawn in from the outside, and then said particles pass through the condensation inner tube;

step 3: the condensation outer tube tightly wrapped around the condensation inner tube circulating a condensation liquid, wherein the condensation liquid is ethanol-water solution at 60-80%, and wherein a temperature of the condensation liquid is set at −20 to −5 degrees Celsius to ensure that the particles passing through the condensation tube condense and grow, and wherein aerodynamic diameters of most $PM_{2.5}$ particles increase to 3-4 micrometers;

step 4: the grown $PM_{2.5}$ particles entering the virtual concentrator, which divides the airflow into two paths: an exhaust gas path and a concentrated gas path, wherein the concentrated gas path is the main path for the grown $PM_{2.5}$ particles to pass through; wherein the an exhaust gas path outlet is connected to the high-flow volume flow controller, which controls an air extraction flow rate of the high-flow vacuum pump, wherein a flow rate in the exhaust gas path is controlled at 55-65 liters per minute, and a range of the high-flow volume flow controller is 0-100 liters per minute, wherein a concentrated gas path outlet is connected to the low-flow volume flow controller, which controls the air extraction flow rate of the low-flow vacuum pump, wherein the flow rate in the concentrated gas path is controlled at 5-6 liters per minute, and a range of the low-flow volume flow controller is 0-12 liters per minute, and wherein when the flow rate in the concentrated gas path accounts for $\frac{1}{9}$ to $\frac{1}{11}$ of a total flow rate, a concentration of the grown $PM_{2.5}$ particles in the concentrated gas path becomes nine to eleven times of an original atmospheric particle concentration, amplifying concentration;

step 5: a rotating vortex being generated in the particulate matter collection bottle, when the airflow in the concentrated gas path passes through, wherein the grown $PM_{2.5}$ particle in the airflow collides with the dimethylacetamide organic reagent in the particulate matter collection bottle and becomes adsorbed, as a result, the trace nitrogen-containing organic fine particles $PM_{2.5}$ are extracted and dissolved in the reagent, achieving online extraction;

step 6: the ultrasonic bath continuously oscillating at regular intervals to ensure full dissolution of $PM_{2.5}$ in the dimethylacetamide organic reagent;

step 7: the fraction automatic supply/collect integrated pump transferring the collected dimethylacetamide organic reagent to the vacuum parallel concentrator at regular intervals based on the set sampling time period;

step 8: the fraction automatic supply/collect integrated pump injecting new dimethylacetamide organic reagent into the particulate matter collection bottle;

step 9: the vacuum parallel concentrator concentrating the sample solution according to set concentration volume and set operation period, and transferring the concentrated sample solution to the micro-injection needle on the micro-injection pump, wherein remaining solution flows into the exhaust liquid bucket; and step 10: finally, the micro-injection pump injecting the collected sample solution into the liquid chromatography-time-of-flight mass spectrometer, wherein during the injection, the micro-injection pump applies a constant injection pressure to the micro-injection needle to ensure a uniform injection volume, wherein after the injection is completed, the liquid chromatography-time-of-flight mass spectrometer is activated to analyze the organic components in the collected sample solution; and repeating step 1 to step 10 in a cyclic manner according to the set time to complete the analysis.

4. The method for analyzing the atmospheric sample of trace nitrogen-containing organic fine particles $PM_{2.5}$, as in claim 3, wherein in step 1, a volume of the dimethylacetamide organic reagent added to the particulate matter collection bottle by the fraction automatic supply/collect integrated pump is in a range of 10-20 milliliters;

in step 2, a temperature of the ultrapure water heated by the resistance heating rod with the temperature sensor is maintained at 35±2 degrees Celsius;

in step 6, an interval between ultrasonic treatments in the ultrasonic bath is 4-8 minutes, and a duration of continuous ultrasonic oscillation is 20-30 minutes;

in step 7, the sampling time period is set to 0.5-24 hours;

in step 8, the fraction automatic supply/collect integrated pump injects a new volume of 10-15 milliliters of dimethylacetamide reagent into the particulate matter collection bottle;

in step 9, the vacuum parallel concentrator is set to concentrate a volume of 0.5-1.5 milliliters, with an operation period of 0.5-2 hours, which is shorter than the set sampling time period; and in step 10, an injection volume of the micro-injection pump is set to 2-10 microliters, with a uniform injection speed in a range of 2-8 microliters per second.

* * * * *